Figure 1:
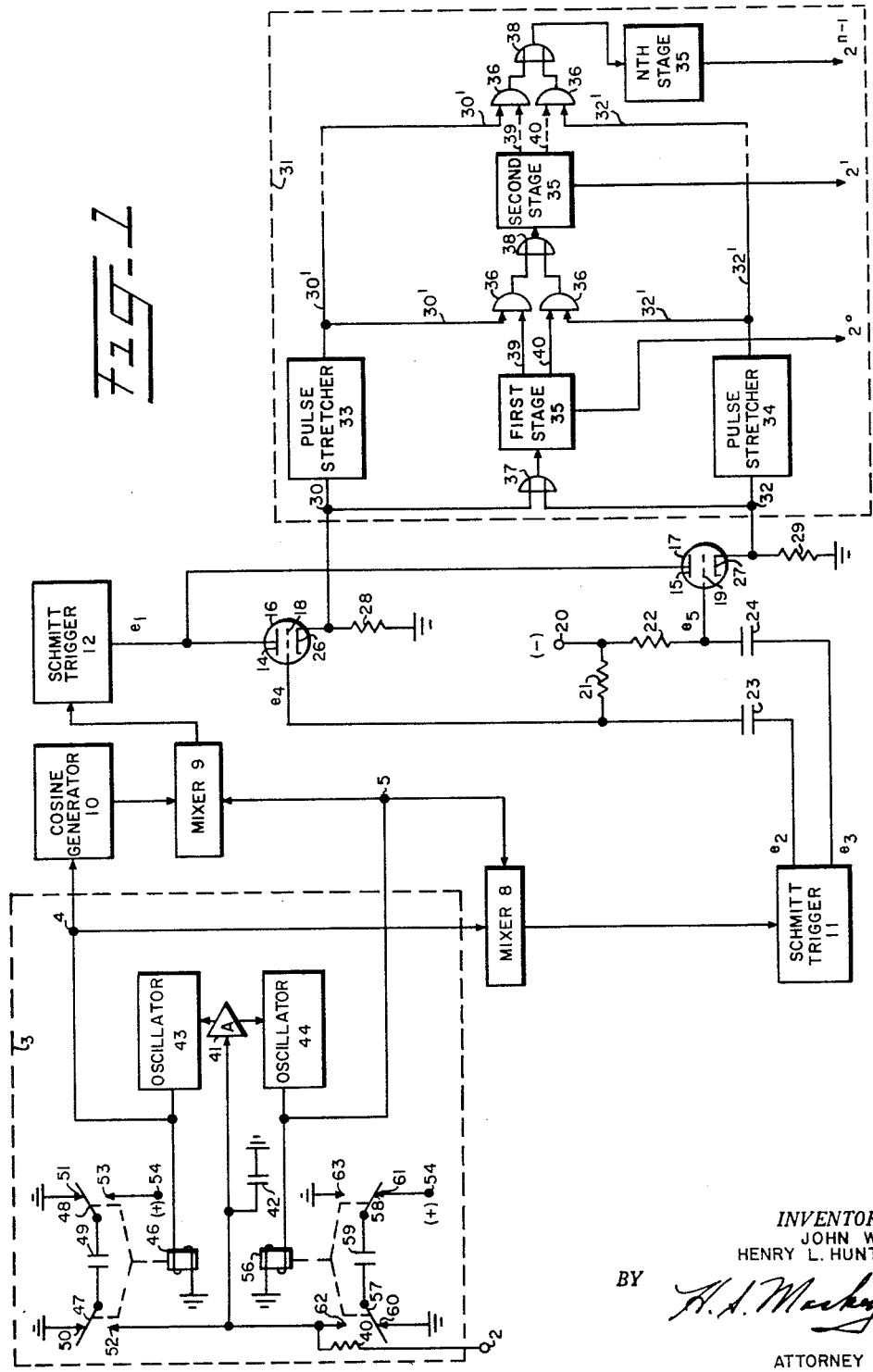

INVENTOR.
JOHN W. GRAY
HENRY L. HUNTER III

ATTORNEY

United States Patent Office 3,155,823
Patented Nov. 3, 1964

3,155,823
INTEGRATOR
John W. Gray and Henry L. Hunter III, Pleasantville, N.Y., assignors to General Precision Inc., a corporation of Delaware
Filed Apr. 16, 1959, Ser. No. 806,907
10 Claims. (Cl. 235—183)

This invention relates to electric signal integrators and more particularly to electric signal integrators which furnish digital output signals representative of the integral of the electric signals applied to the integrator input.

In many instances it is extremely advantageous to represent the time integral of a quantity or value in digital form since the integral may be utilized more easily in that form. In fact, many computers require digital inputs to perform the computations required.

Prior systems operate in either of two basic manners. One system requires the analogue signal to be digitized and then integrated by a digital integrator. The other system utilizes an analogue integrator and then digitizes the result. Both systems have different disadvantages and limitations.

The first system has certain inherent limitations placed on accuracy since the analogue to digital transformation introduces an appreciable error. Furthermore, the digital integrator required is heavy, bulky and subject to a high percentage of failures due to its multiplicity of parts and complex structure. The second system involves the use of electro-mechanical devices which are bulky, heavy and subject to saturation limitations. Both systems are expensive to build and maintain due to either complex structure or a multiplicity of parts.

One object of this invention is to provide a novel electric signal integrator which supplies a digital output and which is compact, light, reliable, accurate, and inexpensive to manufacture.

Another object of the invention is to provide a novel differential converter for converting a unidirectional voltage or current into two alternating voltages the instantaneous frequency difference between which corresponds to the instantaneous magnitude and direction of the unidirectional voltage or current.

The invention contemplates an electric signal integrator comprising, means for receiving an electric signal to be integrated and for providing two alternating voltages, the instantaneous frequencies of which differ from each other by an amount corresponding to the instantaneous value of the electric signal to be integrated; means connected to said alternating voltages for providing output voltages, the magnitude, frequency, and phase of which correspond to the instantaneous value of the said frequency difference; and counting means responsive to said output voltages for providing a digital representation corresponding to the integral of said output voltages.

The foregoing and other objects and advantages of the invention will appear more clearly from a consideration of the specification and drawings wherein one embodiment of the invention is described and shown in detail for illustration purposes only.

Figure 2:
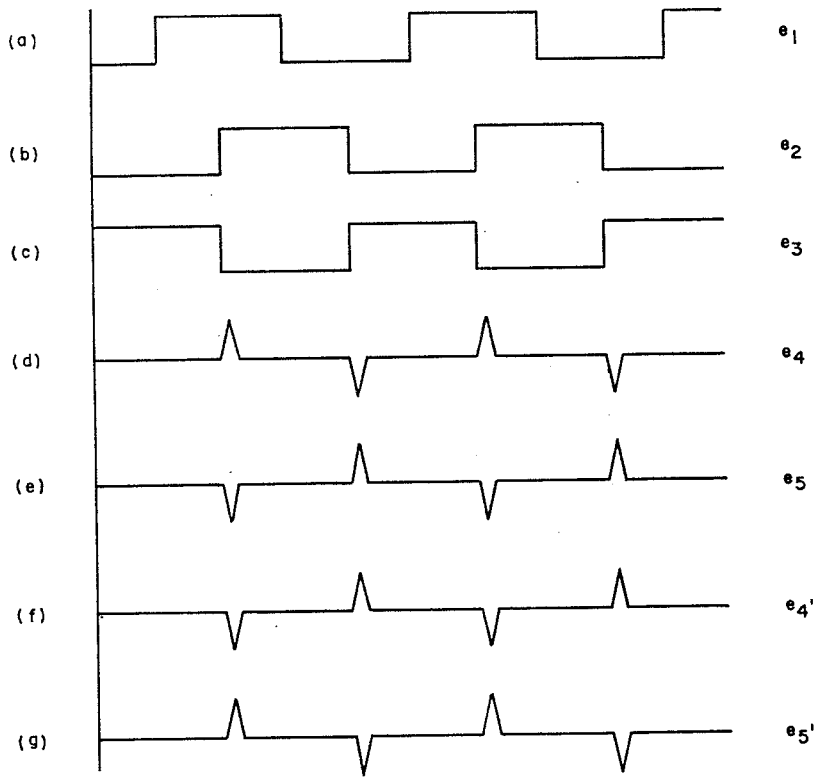

In the drawings:

FIGURE 1 is a block and schematic circuit diagram of a novel integrator constructed in accordance with the invention; and FIGURE 2 is a series of graphs showing voltages at various points in the circuit of FIG. 1.

In FIG. 1 an analogue signal from a source not shown is applied to an input terminal 2 of a differential converter 3, the operation of which will be described in detail later, and which provides two alternating voltages having frequencies $f_1$ and $f_2$ at terminals 4 and 5, respectively. The alternating output voltages at terminals 4 and 5 have an instantaneous frequency difference $(f_1 - f_2)$ which corresponds to the instantaneous value of the analogue input signal. That is, the magnitude of frequency difference $(f_1 - f_2)$ will correspond to the magnitude of the input signal and the algebraic sign of the frequency difference will correspond to the polarity of the input signal.

The alternating voltage appearing at terminal 4 is applied directly to one input of a mixer 8; and to one input of a mixer 9 through a cosine generator 10. The alternating voltage appearing at terminal 5 is applied directly to the other inputs of mixers 8 and 9, respectively. Mixers 8 and 9 are each arranged to provide an alternating voltage having a frequency equal to the difference between the two frequencies applied at their inputs. Thus, the output of mixer 8 is:

$$\sin (f_1 - f_2) t$$

and the output of mixer 9 is:

$$\cos (f_1 - f_2) t$$

where $t$ is time expressed in seconds and $f_1$ and $f_2$ are in cycles per second.

With this arrangement the phase of the output from mixer 9 remains fixed and undergoes no change when $f_1$ goes from larger than $f_2$ to smaller than $f_2$. On the other hand, the phase of the output from mixer 8 undergoes a phase reversal when $f_1$ goes from larger than $f_2$ to smaller than $f_2$.

The output from mixer 8 is applied to a trigger circuit 11 which may be of the Schmitt type and which provides two square wave outputs of opposite phase which have the same frequency and correspond in phase to the output from mixer 8. The outputs are labeled $e_2$ and $e_3$ and are graphically shown in FIG. 2 ($b$ and $c$).

The output from mixer 9 is applied to another trigger circuit 12 which provides a single output $e_1$ which is shown graphically in FIG. 2($a$). Output $e_1$ corresponds in phase to the output of mixer 9. Trigger circuit 12 may not be required under most operating conditions and could in the majority of situations be replaced by a conventional amplifier.

The output $e_1$ from trigger circuit 12 is applied to the plates 14 and 15 of triode vacuum tubes 16 and 17, respectively. The grids 18 and 19 of tubes 16 and 17 are connected to a source of negative potential 20 by resistors 21 and 22, respectively, and to outputs $e_2$ and $e_3$ of trigger circuit 11 by coupling capacitors 23 and 24, respectively. Coupling capacitors 23 and 24 are small and differentiate the square wave outputs $e_2$ and $e_3$ to obtain voltages $e_4$ and $e_5$ which are applied to grids 18 and 19, respectively. Voltages $e_4$ and $e_5$ are shown graphically in FIG. 2 ($d$ and $e$), respectively.

The cathodes 26 and 27 of tubes 18 and 19 are connected to ground by cathode resistors 28 and 29, respectively. An output pulse will result at either cathode from a positive pulse at its grid if, and only if, its plate is positive at the time. Negative grid pulses have no effect. Thus, depending on the phase relationship between $e_1$ and $(e_2, e_3)$ an output will develop across either cathode resistor 28 or 29. That is, if the input signal to differential converter 3 is positive an output having a frequency corresponding to the magnitude of the input signal will be developed across one cathode resistor and should the polarity of the input signal change the output will transfer to the other cathode resistor. In both cases, however, the frequency of the output is determined solely by the magnitude of the input signal.

Cathode 26 is connected to one input 30 of a reversible binary digital counter 31 and cathode 27 is connected to a second input 32. The triggering arrangement of counter 31 is such that when one input has a signal the counter will add and when the signal is at the other input the counter will subtract. Therefore, the counter output represents in binary digital form the integral of the input signal.

Counter 31 has $n$ identical stages 35 and is of conventional design. Two pulse stretchers 33 and 34 are connected between input terminals 30 and 32, respectively, and the interstage "and" gates 36 to compensate for the time delay in each stage of the counter and the first stage is fed directly from the input terminals via an "or" gate 37. Each stage has a single-input-driven bistable multivibrator that supplies two differentiated outputs which are alternately energized. One output is connected to one input of an "and" gate 36 by a conductor 39 and the other output is connected to one input of another "and" gate 36 by a conductor 40. The other inputs of "and" gates 36 are connected to pulse stretchers 33 and 34 by conductors 30' and 32', respectively. The outputs of "and" gates 36 are combined in "or" gates 38 to trigger successive stages. Each stage is sampled to determine what state it is in. The first stage furnishes information relative to the value of the ($2^0$) digit, the second information relative to the value of the ($2^1$) digit, and the $n$th information relative to the value of the ($2^{n-1}$) digit.

The first stage is triggered to its opposite stable state by a pulse on either conductor 30' or 32'. The succeeding stages are triggered to their opposite states by preceding stage outputs in a manner which depends on the location of the input pulse. If the input is via conductor 30', a stage will be triggered only when a positive output is provided on conductor 39 of the preceding state; if on the other hand the input is via conductor 32', a stage will be triggered only if a positive output is provided on conductor 40 of the preceding stage. This type of controlled triggering of successive stages yields the desired effect of counting up or down, as is obvious on consideration of the sequence of binary numbers, 000, 001, 010, 011, 100, 101, etc. The least significant digit, which is generated by the first stage, always changes, whether increasing or decreasing by one count. When counting up, all digits but the least significant digit change only when the next lower order digit changes from 1 to 0, but when counting down they change only when the next lower order digit changes from 0 to 1.

FIG. 2 ($f$ and $g$) are similar to ($d$ and $e$) but show the inputs to the grids for an opposite polarity input signal. This illustrates graphically how the output is changed from one cathode to the other to reverse the counter 31.

The novel differential converter 3 of FIG. 1 is particularly suited for use in the integrator as shown but may be used in any equipment of system requiring a differential alternating output from a direct current input. The converter has a resistor 40 connected between the input terminal 2 and a high-gain direct-current differential amplifier 41 which may be of the type described in Vol. 18 of the Radiation Laboratory series, by Valley and Wallman, on page 484. The junction of resistor 40 and amplifier 41 is connected to ground via a smoothing capacitor 42 which is utilized to prevent short term changes from causing oscillations.

One output of differential amplifier 41 is used to drive an oscillator 43 and the other an oscillator 44. Oscillators 43 and 44 generate frequencies which are controlled by the magnitudes of the inputs thereto.

The output of oscillator 43 is used to operate a solenoid 46 which actuates two identical switches 47 and 48 simultaneously. The switch arms are connected together by a condenser 49 and the normally closed contacts 50 and 51 of switches 47 and 48, respectively, are both connected to ground. The normally open contact 52 of switch 47 is connected to the input of amplifier 41, and the normally open contact 53 of switch 48 is connected to a source of positive potential 54. With this arrangement a charging current is applied to condensers 49 and 42 when solenoid 46 actuates switches 47 and 48. The charging current applied is proportional to the frequency of oscillation of oscillator 43, and tends to raise the potential input to amplifier 41.

The output of oscillator 44 is used to operate a solenoid 56 which actuates two identical switches 57 and 58 simultaneously. The switch arms are connected together by a condenser 59, having a capacity equal to that of condenser 49. The normally closed contact 60 of switch 57 and the normally open contact 63 of switch 58 are connected to ground. The normally open contact 62 of switch 57 is connected to the input of amplifier 41 and the normally closed contact 61 of switch 58 is connected to source 54 and charges condenser 59 to the voltage of source 54. With this arrangement a discharging current is drawn from condenser 42 when solenoid 56 actuates switches 57 and 58. The discharging current is proportional to the frequency of oscillation of oscillator 44, and tends to lower the potential input to amplifier 41. Thus, when no input voltage is present at input terminal 2 both oscillators will oscillate at the same frequency and the potential applied to the input of amplifier 41 will be zero.

The outputs of amplifier 41 are chosen such as to increase the frequency of oscillator 43 and decrease that of oscillator 44 when its input potental is positive. Thus equilibrium is restored by the oscillators with any input voltage at terminal 2, such that the amplifier input potential is substantially zero and the input current through resistor 40 is just neutralized by the difference of the currents generated by condensers 49 and 59. In this equilibrium condition, therefore, the frequency difference will be a proportional measure of the input voltage and current, and will become negative when the input becomes negative.

While one embodiment only of the invention has been shown and described in detail it is to be expressly understood that the invention is not limited thereto.

What is claimed is:

1. An electric signal integrator comprising, means for receiving an electric signal to be integrated and for providing two alternating voltages, the instantaneous frequencies of which differ from each other by an amount corresponding to the instantaneous value of the electric signal to be integrated; means connected to receive said alternating voltages for providing output voltages the magnitude, frequency, and phase of which correspond to the instantaneous value of the said frequency difference; and counting means responsive to said output voltages for providing a digital reprsentation corresponding to the integral of said output voltages.

2. An electric signal integrator comprising, means for receiving an electric signal to be integrated and for providing a pair of alternating voltages having an instantaneous frequency difference which corresponds to the instantaneous value of the said electric signal, means connected to receive said alternating voltages for providing two pulsating output voltages each of which is a different function of the said frequency difference, and reversible counting means responsive to said pulsating output voltages for providing a digital representation corresponding to the integral of said pulsating output voltages.

3. An electric signal integrator comprising, means for receiving an electric signal to be integrated and for providing two alternating voltages having an instantaneous frequency difference corresponding to the instantaneous value of the electric signal to be integrated; means connected to receive said alternating voltages for providing two pulsating voltages having an instantaneous frequency substantially equal to the difference in frequency between the two alternating voltages and differing in phase by a predetermined amount, means connected responsive to one of said pulsating voltages for supplying two pulsating gating voltages substantially 180° out of phase with each other and which correspond in phase and frequency to the pulsating voltage applied to the said last mentioned means for selectively gating said other pulsating voltage to a counter which provides a digital representation corresponding to the integral of the selectively gated pulsating voltage.

4. An electric signal integrator comprising, means for receiving an electric signal to be integrated and for providing two alternating voltages having an instantaneous frequency difference corresponding to the instantaneous value of the electric signal to be integrated; first and second mixers each having first and second inputs and one output; each of said mixers providing at its output a voltage having a frequency substantially equal to the difference between the frequencies of two alternating voltages applied to the mixer inputs; said mixers each having their first input connected to receive one of the said alternating voltages; said first mixer having its second input connected to receive said other alternating voltage; means connecting said second mixer second input to receive said other alternating voltage and for shifting the phase of the alternating voltage applied to the said second mixer second input; gate means having two inputs, two outputs, and two control elements; said inputs being connected to said second mixer output; means for connecting said control elements to said first mixer output and for providing two voltages at said control elements which correspond in phase and frequency to the first mixer output and are substantially 180° out of phase with each other; and reversible counting means connected to the gate outputs and arranged to count up when supplied by one gate output and count down when supplied by the other gate output.

5. An electric signal integrator as described in claim 4 wherein said means for receiving the electric signal to be integrated includes a differential amplifier which provides two voltages which vary differentially when an input signal is applied thereto, a pair of oscillators each controlled by a different one of said amplifier output voltages, and means providing feedback loops from the output of each oscillator to the input of the amplifier for reducing the amplifier differential output to zero in the absence of an input signal.

6. In an electric signal integrator, a circuit for providing the input to a counter means comprising, means for receiving an electric signal to be integrated and for providing two alternating voltages, the instantaneous frequencies of which differ from each other by an amount corresponding to the instantaneous value of the electric signal to be integrated; and means connected to receive said alternating voltages for providing output voltages the magnitude, frequency, and phase of which correspond to the instantaneous value of the said frequency difference.

7. In an electric signal integrator, a circuit for providing the input to a counter means comprising, means for receiving an electric signal to be integrated and for providing a pair of alternating voltages having an instantaneous frequency difference which corresponds to the instantaneous value of the said electric signal, and means connected to receive said alternating voltages for providing two pulsating output voltages each of which is a different function of the said frequency difference.

8. In an electric signal integrator, a circuit for providing the input to a counter means comprising, means for receiving an electric signal to be integrated and for providing two alternating voltages having an instantaneous frequency difference corresponding to the instantaneous value of the electric signal to be integrated; means connected to receive said alternating voltages for providing two pulsating voltages having an instantaneous frequency substantially equal to the difference in frequency between the two alternating voltages and differing in phase by a predetermined amount, and means responsive to one of said pulsating voltages for supplying two pulsating gating voltages substantially 180° out of phase with each other and which correspond in phase and frequency to the pulsating voltage applied to the said last mentioned means.

9. In an electric signal integrator, a circuit for providing the input to a counter means comprising, means for receiving an electric signal to be integrated and for providing two alternating voltages having an instantaneous frequency difference corresponding to the instantaneous value of the electric signal to be intergrated; first and second mixers each having first and second inputs and one output; each of said mixers providing at its output a voltage having a frequency substantially equal to the difference between the frequencies of two alternating voltages applied to the mixer inputs; said mixers each having their first input connected to receive one of the said alternating voltages; said first mixer having its second input connected to receive said other alternating voltage; means connecting said second mixer second input to receive said other alternating voltage and for shifting the phase of the alternating voltage applied to the said second mixer second input; gate means having two inputs, two outputs, and two control elements; said inputs being connected to said second mixer output; and means for connecting said control elements to said first mixer output and for providing two voltages at said control elements which correspond in phase and frequency to the first mixer output and are substantially 180° out of phase with each other.

10. A circuit as described in claim 9 wherein said means for receiving the electric signal to be integrated includes a differential amplifier which provides two voltages which vary differentially when an input signal is applied thereto, a pair of oscillators each controlled by a different one of said amplifier output voltages, and means providing feedback loops from the output of each oscillator to the input of the amplifier for reducing the amplifier differential output to zero in the absence of an input signal.

References Cited in the file of this patent

UNITED STATES PATENTS

| | | |
|---|---|---|
| 2,445,662 | Davie | July 20, 1948 |
| 2,572,016 | Elbourn | Oct. 23, 1951 |
| 2,733,391 | Mayer | Jan. 31, 1956 |
| 2,806,205 | Donath | Sept. 10, 1957 |
| 2,903,185 | Myers | Sept. 8, 1959 |
| 2,911,641 | Kohler | Nov. 3, 1959 |
| 2,926,335 | Bower | Feb. 23, 1960 |
| 2,932,449 | Pisarchick | Apr. 12, 1960 |
| 2,942,779 | Wood | June 23, 1960 |
| 2,950,052 | Knox | Aug. 23, 1960 |